(12) United States Patent
Elam

(10) Patent No.: US 6,758,072 B1
(45) Date of Patent: Jul. 6, 2004

(54) VEHICULAR STEERING WHEEL LOCK

(75) Inventor: David Michael Elam, Huddersfield (GB)

(73) Assignee: Chia-Lin Chen, Taipei Hsien (TW)

( * ) Notice: Subject to any disclaimer, the term of this patent is extended or adjusted under 35 U.S.C. 154(b) by 0 days.

(21) Appl. No.: 10/631,778

(22) Filed: Aug. 1, 2003

(51) Int. Cl.⁷ .............................................. B60R 25/02
(52) U.S. Cl. .......................................... 70/209; 70/237
(58) Field of Search .......................... 70/209, 211, 212, 70/225, 226, 237, 238

(56) References Cited

U.S. PATENT DOCUMENTS

| | | | | |
|---|---|---|---|---|
| 5,024,069 A | * | 6/1991 | Hull et al. ..................... | 70/209 |
| 5,052,201 A | * | 10/1991 | Liou ............................ | 70/209 |
| 5,097,685 A | * | 3/1992 | Lien ............................ | 70/209 |
| 5,199,284 A | * | 4/1993 | Lin ............................. | 70/209 |
| 5,400,627 A | * | 3/1995 | Liao ............................ | 70/209 |
| 5,426,960 A | * | 6/1995 | Jan ............................. | 70/209 |
| 5,435,158 A | * | 7/1995 | Ta-Yung ....................... | 70/209 |
| 5,454,242 A | * | 10/1995 | Su .............................. | 70/209 |
| 5,595,078 A | * | 1/1997 | Harrell ........................ | 70/209 |
| 5,765,415 A | * | 6/1998 | Savinsky ...................... | 70/209 |
| 5,816,082 A | * | 10/1998 | Gabrielyan ................... | 70/209 |
| 5,842,360 A | * | 12/1998 | Somerfield ................... | 70/209 |
| 6,460,385 B1 | * | 10/2002 | Vito ............................ | 70/209 |

\* cited by examiner

*Primary Examiner*—Lloyd A. Gall
(74) *Attorney, Agent, or Firm*—Rosenberg, Klein & Lee

(57) ABSTRACT

A vehicular steering wheel lock includes a hollow tube and a rod. The tube has a lock core transverse through one end, a pair of slots close to the center portion, and a cross bar extending from one end to the center of the tube and above the slots. The rod comprises a pair of posts extending from one side corresponding to the slots and aligning with the cross bar to form an enclosure for confining the movement of the steering wheel.

3 Claims, 7 Drawing Sheets

VEHICULAR STEERING WHEEL LOCK

FIELD OF THE INVENTION

This invention relates to a vehicular steering wheel lock, and more particularly to a lock with a pair of posts aligning with a cross bar to form an enclosure for confining the movement of a steering wheel.

BACKGROUND OF THE INVENTION

There are many steering wheel locks on the market, such as US Pat. Nos. 6,223,568 and 6,223,569. Both the patents describe a tube with a lock core. Wherein a rod is in the tube and is controlled by the lock core to slide in the tube. The sliding movement allows the rod to extend or to retreat within the tube. That increases the difficulty of turning the steering wheel when the lock is attached on the steering wheel. However, the rod may break the window accidentally. Thus it is not convenient in use.

SUMMARY OF THE INVENTION

It is the primary objective of the present invention to provide a vehicular steering wheel lock, which is easy to operate.

It is another objective of the present invention to provide a vehicular steering wheel lock, which is safe in use.

It is a further objective of the present invention to provide a vehicular steering wheel lock, which is compact in size and is easy to store.

DETAILED DESCRIPTION OF THE PREFERRED EMBODIMENTS

Figure 1:
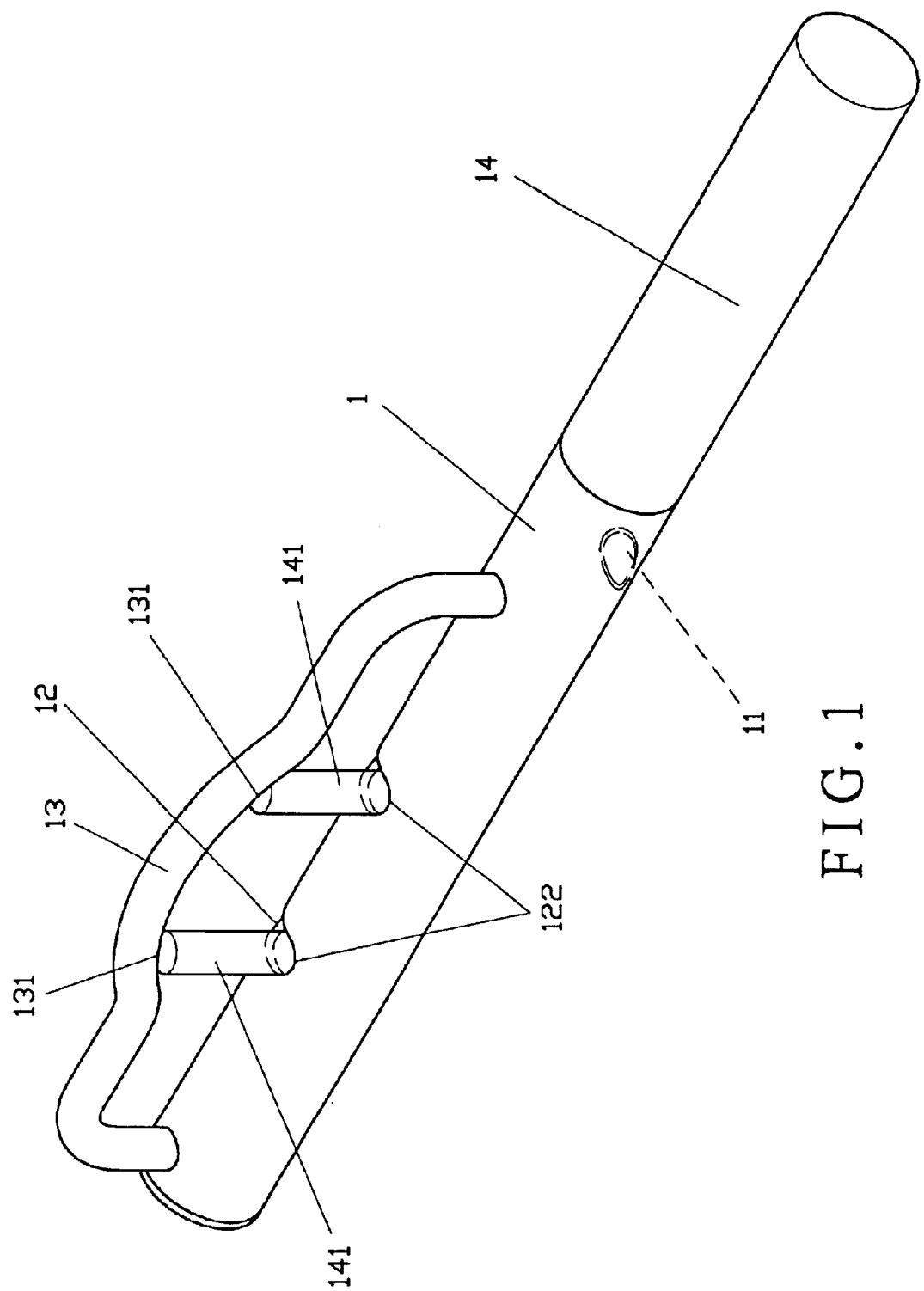
FIG. 1 is a perspective view of the present invention.

As shown in FIG. 1, the present invention comprises a hollow tube 1. The tube 1 has a lock core 11 at one end, a pair of slots 12 having two sides 121 and 122, and an arcuate cross bar 13 protruding from the tube 1 with a pair of engaging edges 131 facing one side 121 or 122 of each of the slots 12.

The tube 1 is provided with a rod 14 at the rear end. The rod 14 has a pair of posts 141 extending outward from the slots 12. When rotating the rod 14, the two posts 141 rotate simultaneously within the slots 12. The rotation of the posts 141 within the slots 12 brings the posts 141 to either side 121 or 122. When reaching to the side 122 of the slots 12, the posts 141 will be underneath the engaging edges 131 of the cross bar 13 to form an enclosure. When the rotation of the posts 141 brings the posts 141 to the other side 121, the posts 141 depart from the cross bar 13 and the enclosure is in an open status. The rotation of the posts 141 is linked by the rod 14 which is controlled by the lock core 11.

Figure 2:
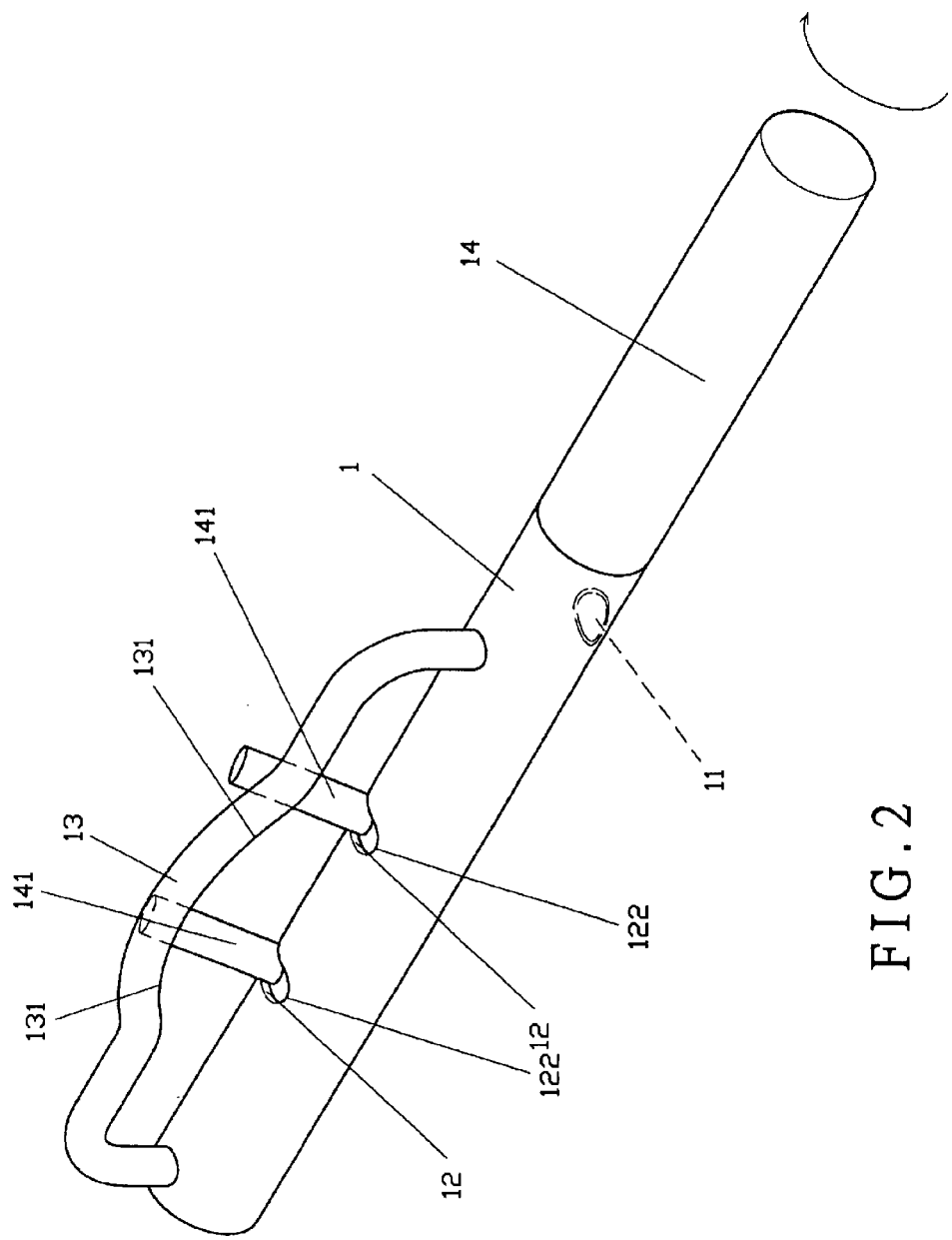
FIG. 2 is a perspective view similar to FIG. 1, depicting the rotation of the posts to form an enclosure with respect to the cross bar of the tube.
Figure 3:
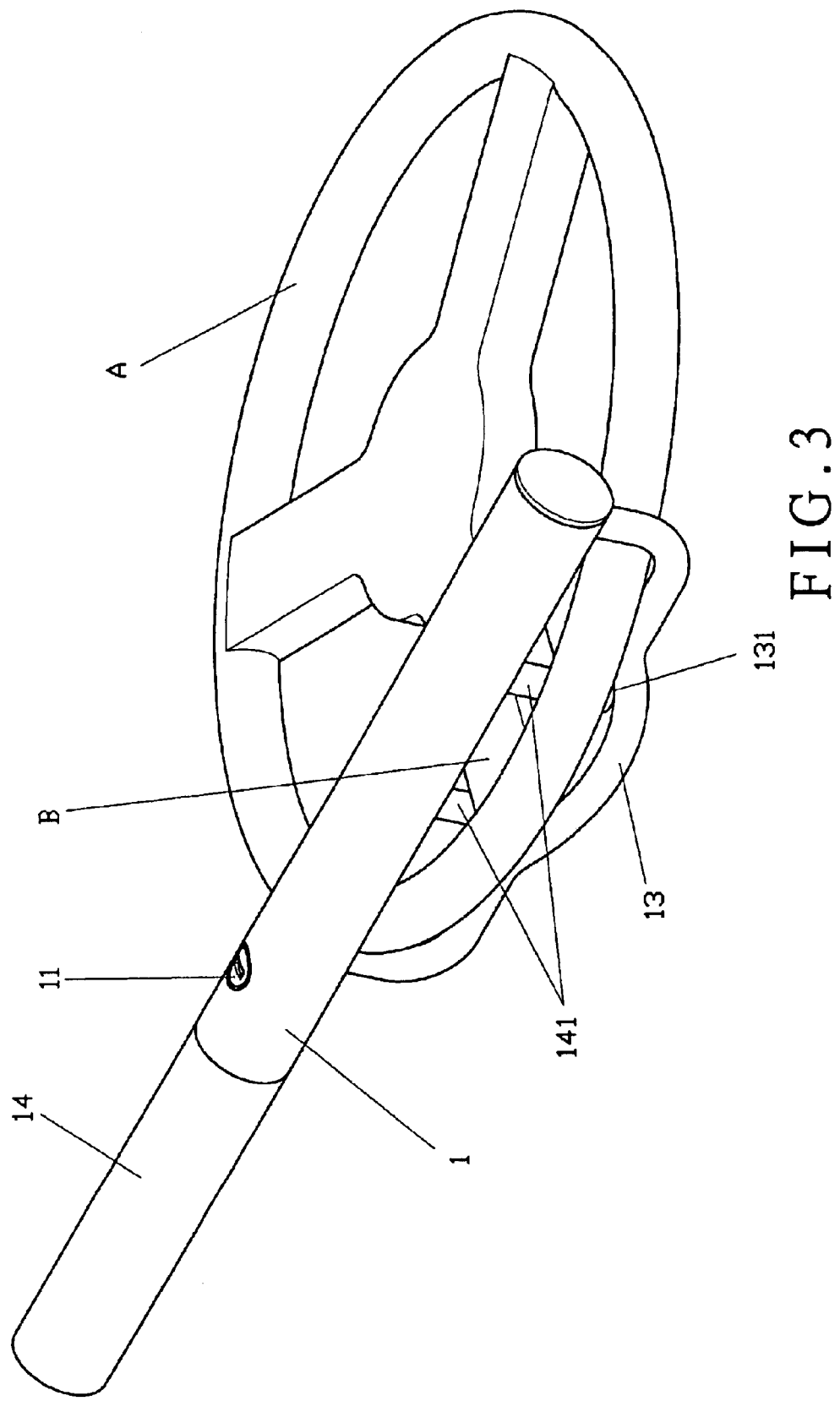
FIG. 3 is a perspective view showing a steering wheel being in a locked position by the lock of the present invention.
Figure 4:
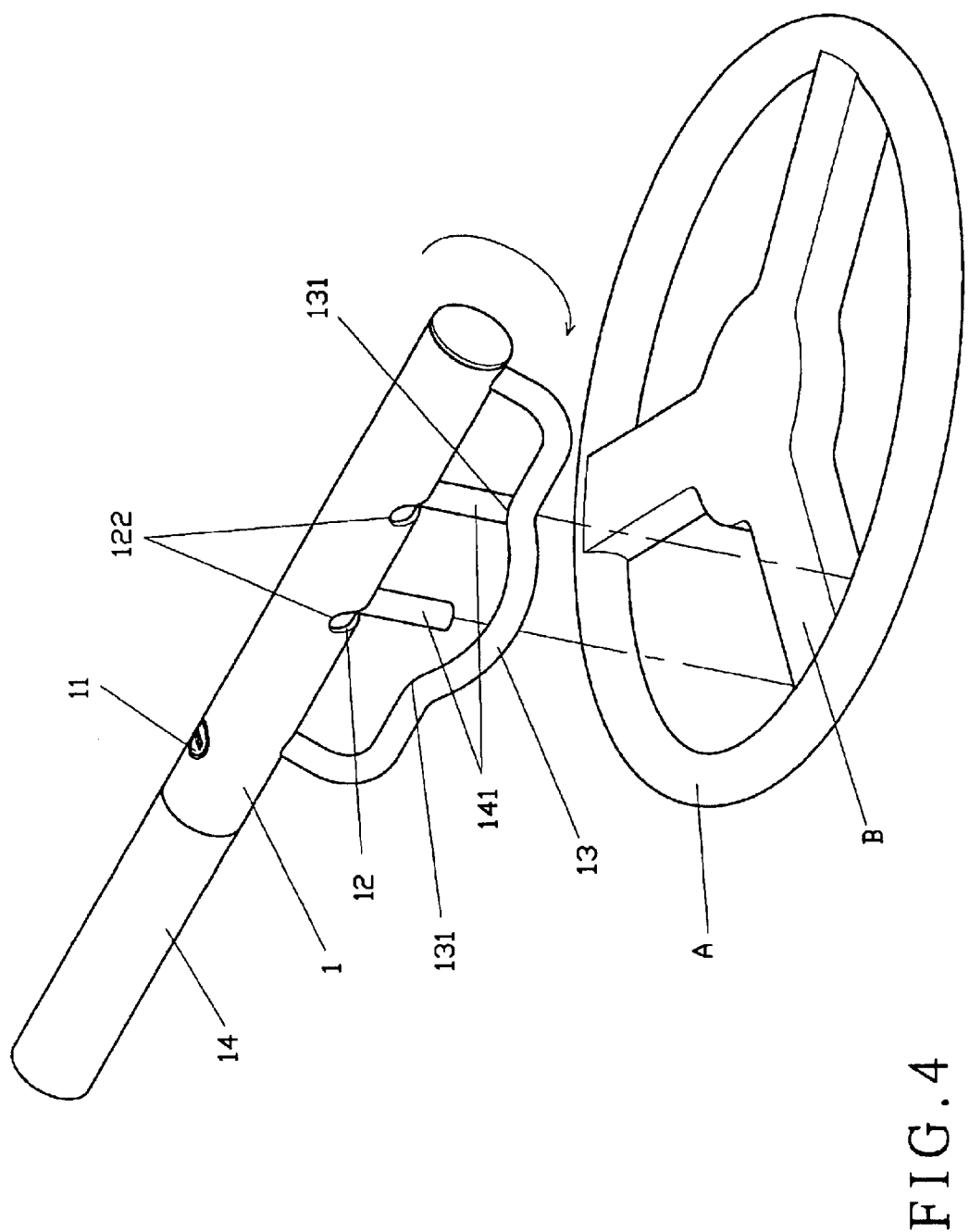
FIG. 4 is a perspective view showing an unlocked position of the lock of the present invention.
Figure 5:
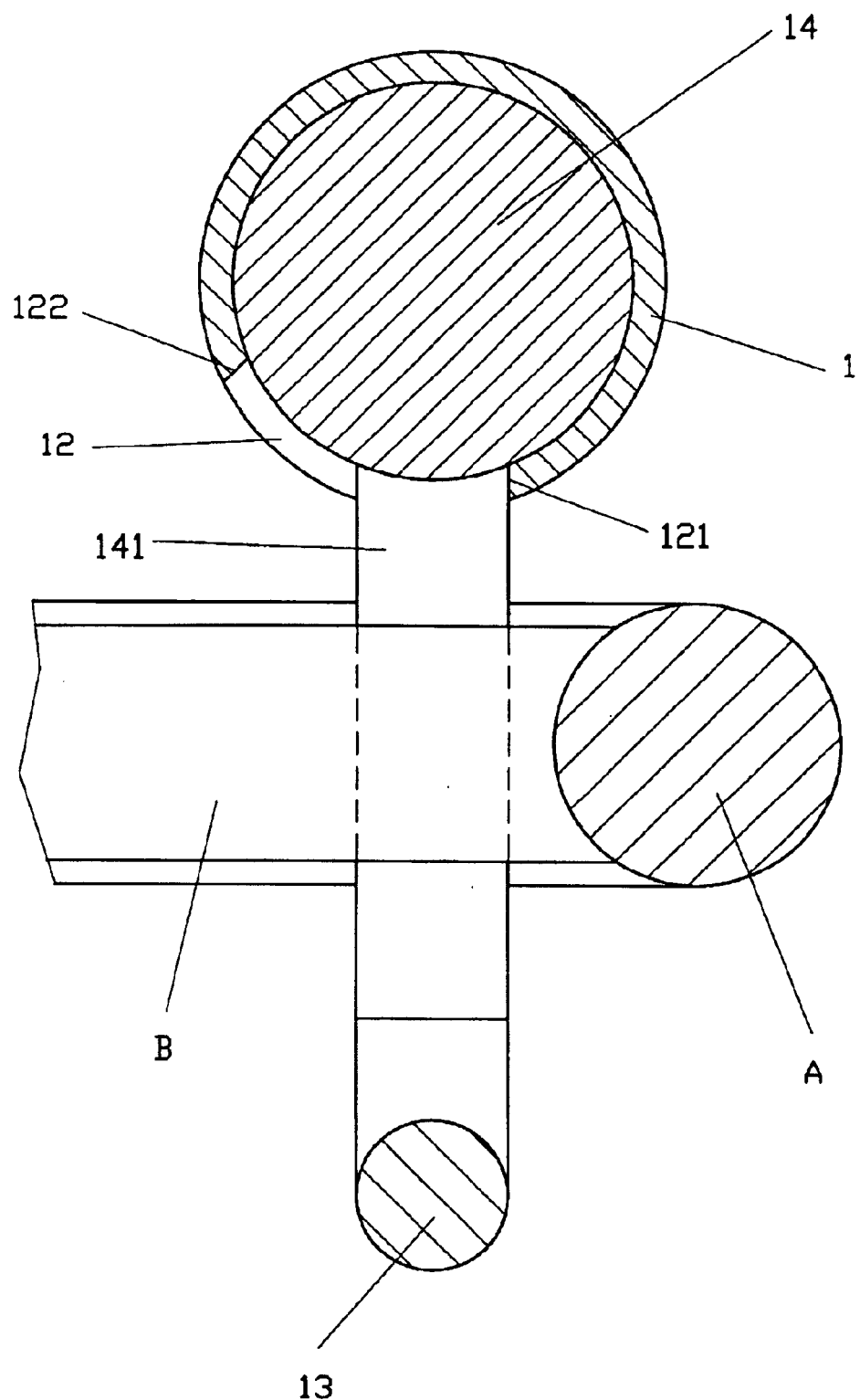
FIG. 5 is a side cross-sectional view of FIG. 1.

To operate the present invention, as shown in FIG. 2, the lock core 11 is turned off and the rod 14 is rotated to bring the rotation of the post 141 from the side 122 to the other side 121. The posts 141 depart from the engaging edges 131 of the cross bar 13. The lock may be placed on a steering wheel A with the two posts 141 cross over an arm B of the steering wheel A, as shown in FIGS. 3, 4 and 5. The cross bar 13 is placed underneath the steering wheel A. The rod 14 is rotated to move the two posts 141 from the side 121 of the slots 12 to the other side 122 and aligned with the cross bar 13 and facing the engaging edges 131, thus the steering wheel A is confined to move.

To unlock the steering wheel A, the lock core 11 is unlocked and the rod 14 is rotated to bring the two posts 141 from the side 122 to the other side 121 of the slots 12, and depart from the engaging edges 131 of the cross bar 13, thus the lock is free to lift from the steering wheel A.

Figure 6:
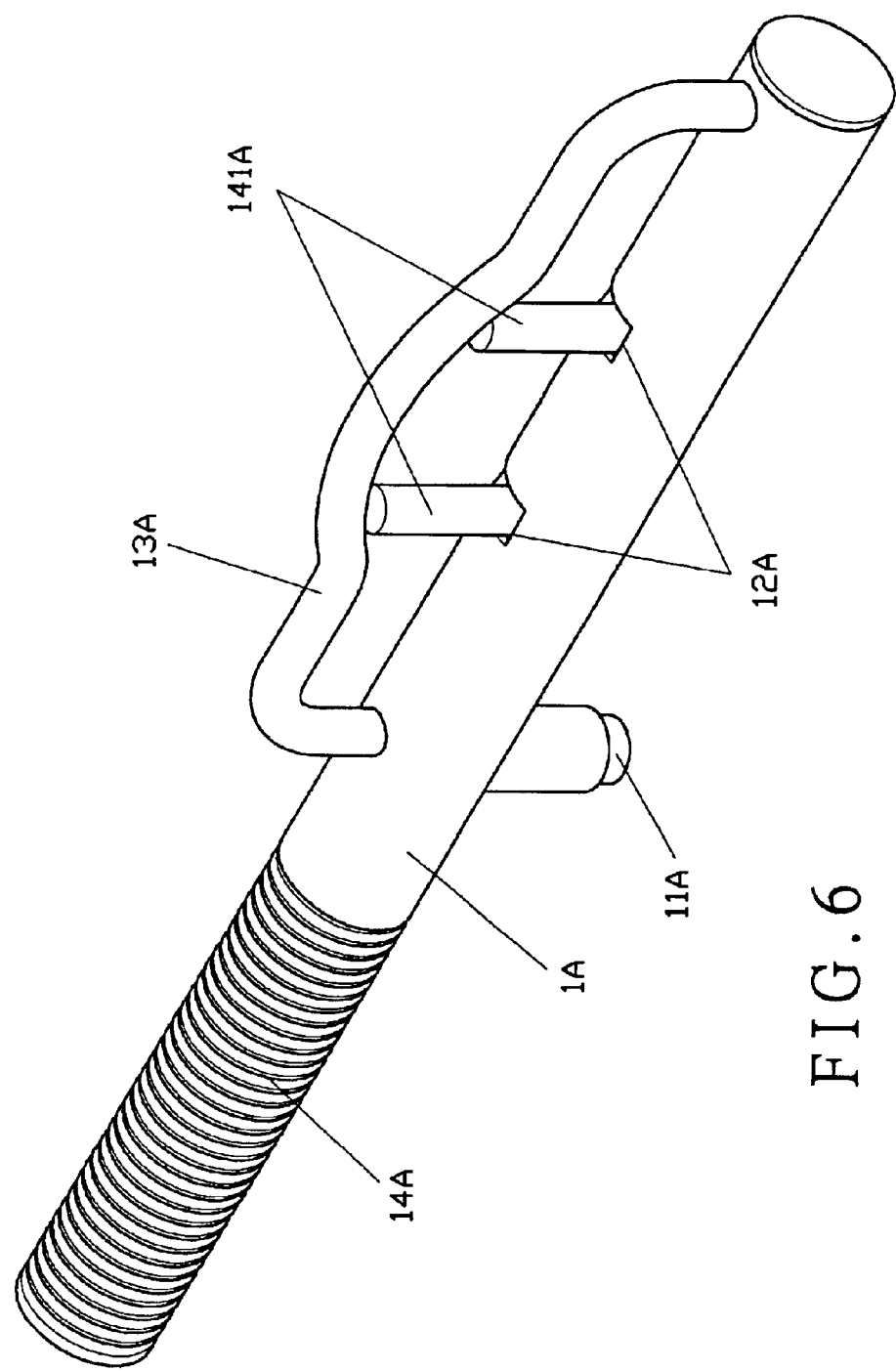
FIG. 6 is a perspective view of a second embodiment of the present invention.
Figure 7:
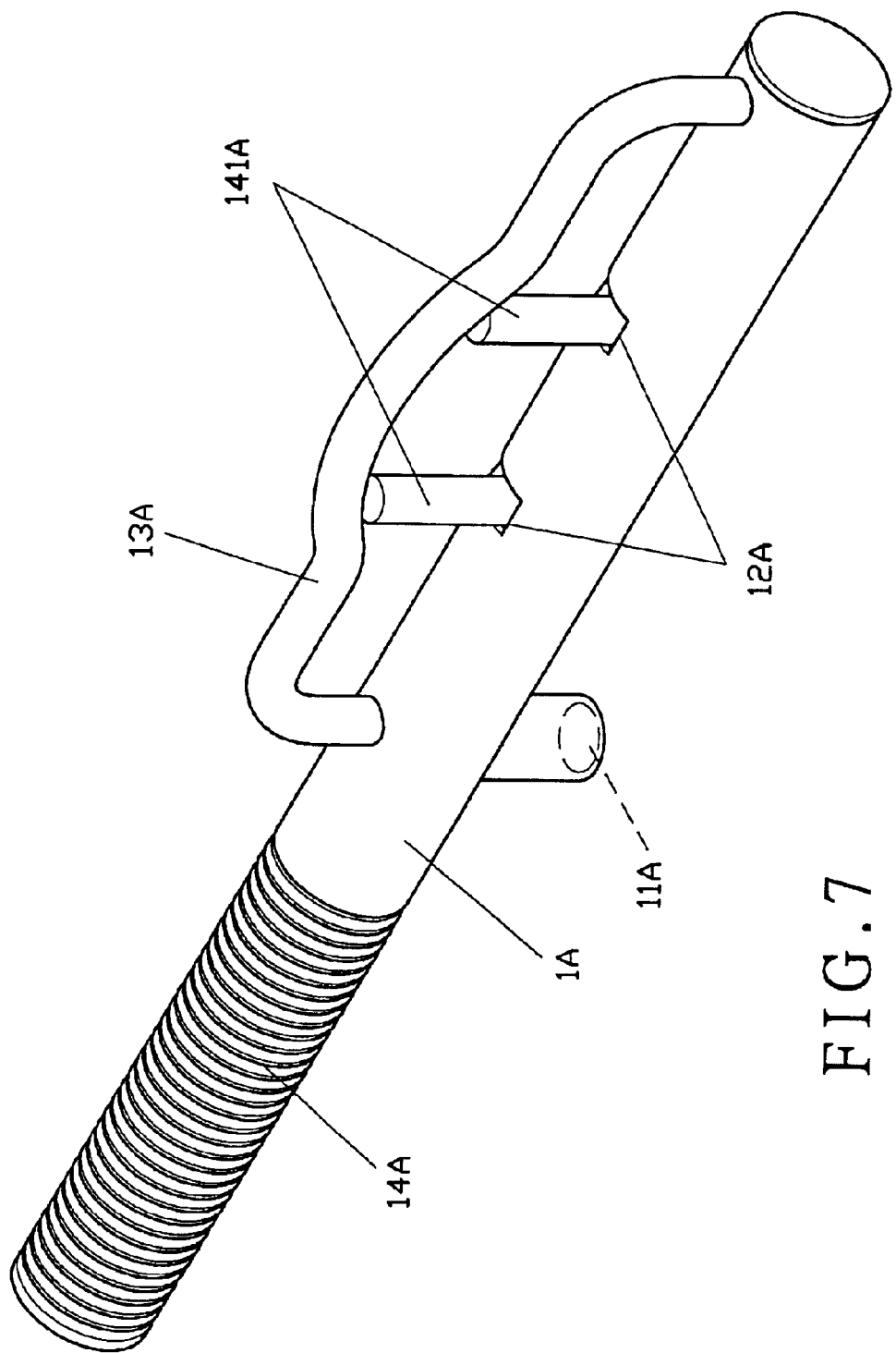
FIG. 7 is a perspective view of FIG. 6 showing the lock in a locked status.

FIG. 6 shows a second embodiment of the present invention, which includes a tube 1A having a lock core 11A, a pair of slots 12A, a cross bar 13A, a rod 14A, and a pair of posts 141. The lock core 11A is a push type, which can be pushed inward to reach a locked status without the need of a key.

I claim:

1. A vehicular steering lock comprising a tube with a lock core, said tube having two slots at a center portion thereof, said tube comprising a cross bar protruding upwardly from said tube, a rear end of said tube being provided with a rod, said rod comprising a pair of posts protruding therefrom and extending outwardly from said slots of said tube and being able to rotate within said slots.

2. The vehicular steering wheel lock, as recited in claim 1, wherein said cross bar is located above one side of said slots.

3. The vehicular steering wheel lock, as recited in claim 1, wherein said cross bar is in an arcuate shape and comprises engaging edges.

* * * * *